United States Patent [19]

Cassidenti

[11] Patent Number: 4,555,204
[45] Date of Patent: Nov. 26, 1985

[54] METAL-WORKING TOOLS WITH AUGMENTED CONDUCTIVITY

[75] Inventor: Michael L. Cassidenti, Canoga Park, Calif.

[73] Assignee: Rockwell International Corporation, El Segundo, Calif.

[21] Appl. No.: 729,078

[22] Filed: Apr. 30, 1985

Related U.S. Application Data

[63] Continuation-in-part of Ser. No. 542,281, Oct. 14, 1983, abandoned.

[51] Int. Cl.$^4$ .................. B23C 51/02; B23C 51/06
[52] U.S. Cl. ............................. 408/144; 407/119; 408/230; 409/136
[58] Field of Search ............... 408/144, 230; 409/136; 407/119; 76/108 T

[56] References Cited

U.S. PATENT DOCUMENTS 2,240,840  5/1941  Fischer .................. 408/144
2,537,818  1/1951  Evans .................... 408/144
3,945,807  3/1976  Fukutome .............. 408/230 X

FOREIGN PATENT DOCUMENTS 261869  6/1970  U.S.S.R. ................ 408/144

Primary Examiner—Z. R. Bilinsky
Attorney, Agent, or Firm—H. Fredrick Hamann; Harry B. Field; Lawrence N. Ginsberg

[57] ABSTRACT

A metal-working tool with augmented electrical and thermal conductivity. In a metal-working tool, such as a drill bit 10, having at least one groove 14 behind a cutting edge 34, a coating 12 is placed on the surface of the groove 14. The coating 12 is formed from a material having a higher electrical conductivity than the material from which the bit 10 is formed and, preferably, the coating material also has a higher thermal conductivity. The coating 12 reduces the resistance of the bit 10, thereby reducing the heating of the cutting edge 34. The improved thermal conductivity also reduces the heating of the cutting edge 34.

12 Claims, 4 Drawing Figures

METAL-WORKING TOOLS WITH AUGMENTED CONDUCTIVITY

This is a continuation-in-part of co-pending application Ser. No. 542,281 filed on Oct. 14, 1983, now abandoned.

BACKGROUND OF THE INVENTION

1. Field of the Invention

This invention relates to metal-working tools and especially to metal-working tools through which electric current is passed for heating a workpiece.

2. Description of the Prior Art

Many metals, such as Inconel 718, titanium, etc., react to being worked by work-hardening, i.e., lose ductility and crack, when they are worked by various techniques, such as forming with dies and punches in a press, drilling with drill bits, turning in a lathe, etc. It has been found that work-hardening can be reduced or eliminated by heating the metallic workpiece. Also, these materials are difficult to machine which results in slow metal-removal rates and short tool life.

One method of heating the workpiece is by resistance heating. An electric current can be passed through the metal-working tool into the workpiece, thereby heating the workpiece at the shear zone. Unfortunately, while heating the shear zone of the workpiece, the cutting edge of the metal-working tool is also heated causing rapid deterioration of the metal-working tool. The tool has to be replaced frequently with extra down-time and expense being added to the metal-working portion of the manufacturing process.

OBJECTS OF THE INVENTION

An object of the invention is to lengthen the life and improve the wear characteristic of metal-working tools, especially those through which electric current is passed to heat the workpiece.

Another object is to reduce the expense imposed by rapid deterioration caused by the heating of such tools.

A further object is to increase metal removal rates in metal-working tools where the workpiece is heated.

Other objects, advantages and novel features of the present invention will become apparent from the following detailed description of the invention when considered in conjunction with the accompanying drawing.

SUMMARY OF THE INVENTION

The objects advantages of the present invention are achieved by coating non-metal-working regions of metal-working tools with a material which has better electrical and thermal conductivity than the material from which the tool is fabricated. The better electrical conductivity reduces the electrical resistance of the tool and thus reduces the heat developed in the tool. Additionally, heat is drawn away at a faster rate by the better thermal conductivity so that the tool is kept cooler than it would be without the coating. The improved electrical conductivity and thermal conductivity also permit a higher current concentration for a given tool temperature.

BRIEF DESCRIPTION OF THE DRAWINGS

The same elements or parts throughout the figures of the drawing are designated by the same reference characters.

DETAILED DESCRIPTION OF THE INVENTION

Figure 1:
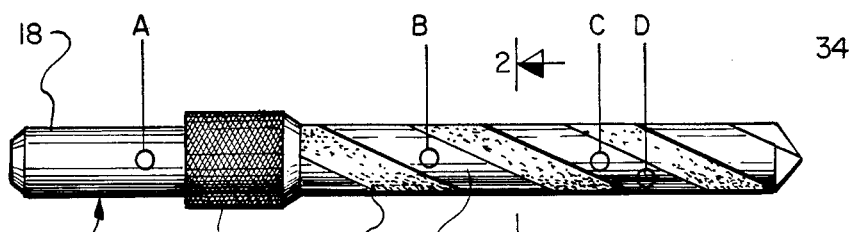
FIG. 1 is a schematic illustration of an embodiment of the invention as employed with a drill bit.

FIG. 1 shows a metal-working tool 10, in this particular case a drill bit, which is formed from a hard metal such as carbide steel, for instance. A conductive coating 12, of a metal which has better electrical and thermal conductivity than the material from which the drill bit 10 is fabricated, such as copper, for example, is laid down and bonded within the grooves 14 of the bit 10. The conductive coating 12 may be applied by conventional chemical plating techniques. The coating 12 preferably extends for some distance 16 along the chuck end 18 of the bit 10 and extends down to, but does not cover, the work edge 34 of the bit 10. The coating 12 should be relatively thick, the term "relatively thick" meaning roughly in the range of 0.02 to 0.05 inches.

Figure 2:
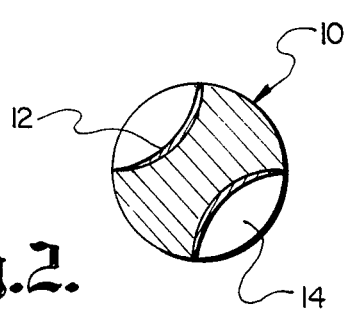
FIG. 2 is a cross-sectional view of the drill bit of FIG. 1 taken along line 2—2.
Figure 4:
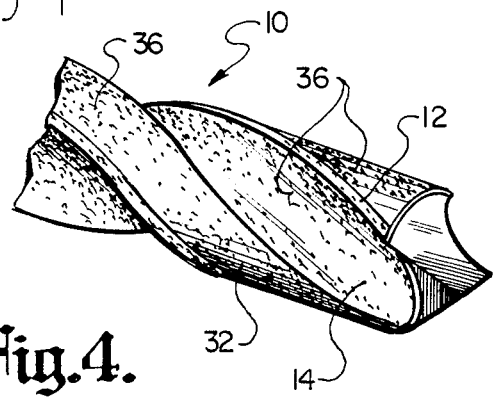
FIG. 4 is a perspective view of a drill bit which has an insulative coating on the lands and on the conductive coating and also has a high-conductivity insert or core.

FIG. 2 shows a cross-section of the bit 10 taken along the line 2—2.

Figure 3:
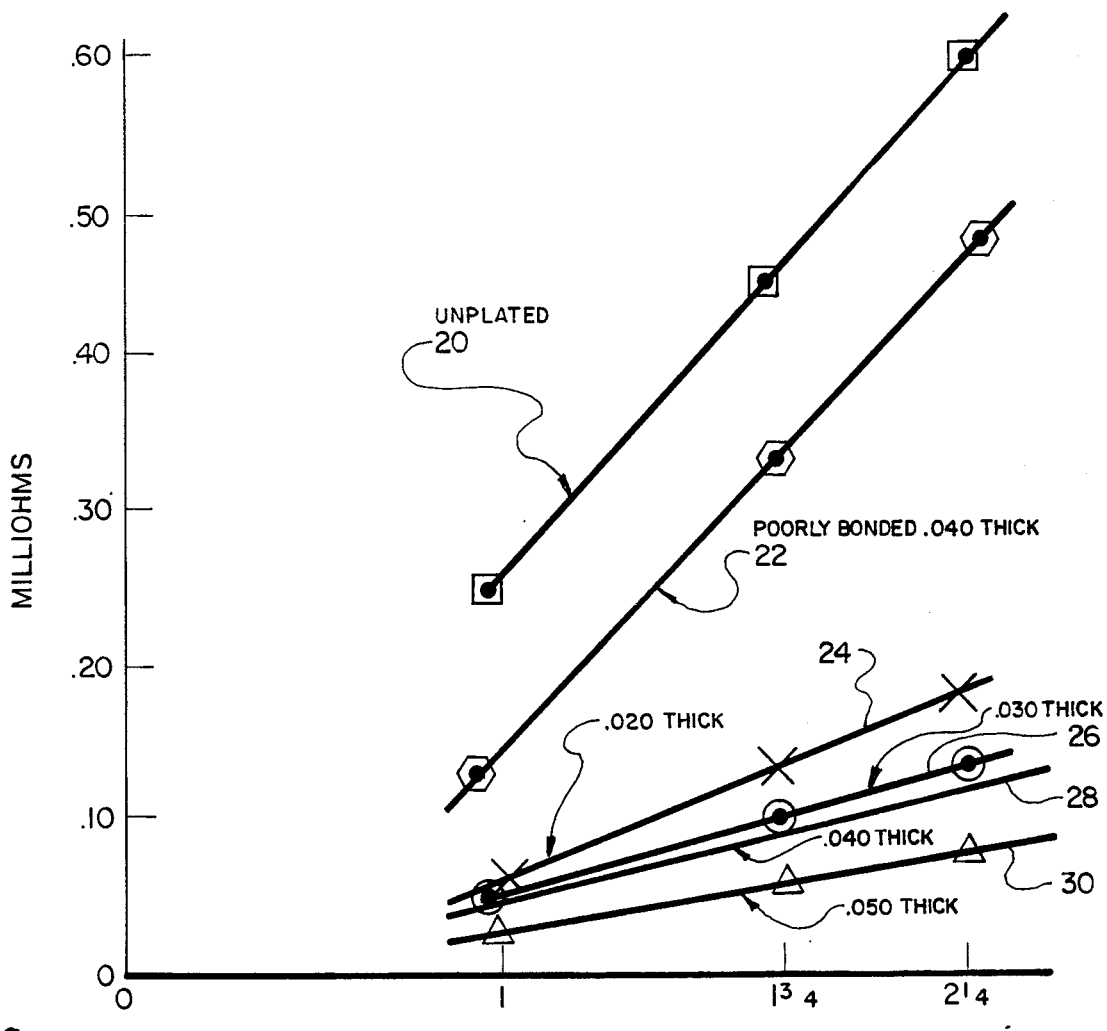
FIG. 3 is a graph showing electrical resistance vs drill length for an uncoated drill bit and for several differently coated bits.

The coating 12 decreases the electrical resistance of the drill bit 10 as indicated in the graph shown in FIG. 3. The resistance was measured from points A to B (1"), A to C (1¾") and A to D (2¼") for an unplated drill bit (20), a poorly bonded drill bit with a coating 0.040" thick (22), and drill bits with well-bonded coating 0.020" thick (24), 0.030" thick (26), 0.040" thick (28), and 0.050 thick (30). Thus, the resistance for a distance of 2¼" along the drill bit 10 was approximately as follows:

unplated: 0.06 milliohms
poorly bonded: 0.47 milliohms
0.020"-thick plating: 0.15 milliohms
0.030"-thick plating: 0.11 milliohms
0.040"-thick plating: 0.10 milliohms
0.050"-thickplating: 0.08 milliohms It can be seen that the resistance of the bit 10 is considerably reduced by the coating 12 being approximately 1/6 the resistance of the unplated bit for coatings 0.030" and 0.050" thick.

For the same amount of current passing through the drill bit 10 to the workpiece, the effect of such a coating is to reduce heating in the bit 10 in three ways:

1. the higher thermal conductivity of the coating 12 conducts heat away from the cutting edges of the bit 10 at a faster rate;
2. the lower resistance of the bit 10 results in lower resistance heating in the bit 10 (heat is proportional to $I^2R$ where I is the electrical current value and R is the electrical resistance through which it passes;
3. the coating 12 presents an alternate path for the current, most of the current passing through the coating and through the chips which are being cut off the workpiece to the workpiece itself, so that less current passes through the cutting edges of the bit 10.

Thus, the coating 12 reduces the heat experienced by the cutting edges of the bit 10, and improves the life expectancy of the bit. The same concept can be applied to other grooved metal-working tools such as those used in lathes, thread-forming tools, etc.

Unless the workpiece is sheet metal or other thin material, lands 32 and conductive coating 12 of the bit 10 are preferably coated with a tough, electrically insulative coating 36 such as titanium oxide or aluminum oxide. Use of the insulative coating 36 is beneficial with thick workpieces because it insures that the bulk of the electric current flow is between the bit and the workpiece near the shear zone of the workpiece where the chip is being sheared. Insulative coating 36 prevents electric current from flowing between the sides of the drill bit and the workpiece once the drill bit enters the hole it is producing.

Metal-working tools, such as milling cutters and lathe cutters, which do not have grooves can also use the high-conductivity coating of the present invention. This is especially true if one or more chips are formed which contact the coating, but is also true if the chips do not contact the coating. In the latter case, the resistance of the tool is decreased and its thermal conductivity is improved anyway. It should also be noted that the tools need not have a coating but may be formed with an internal high-conductivity core or insert 38. In the drill bit, the insert 38 would not be long enough or have enough diameter to weaken the bit 10, but would still increase the electrical and thermal conductivity.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In an electrically conductive metal-working tool, through which electric current may be passed for heating a workpiece, said tool having at least one groove and at least one land, said land being adjacent to a cutting edge, the improvement comprising:
   a relatively thick electrically conductive coating bonded to the surface of said groove, said conductive coating being formed from a material having higher electrical conductivity than the material from which the metal-working tool is formed, the land being coating-free, said conductive coating permitting a substantial portion of the electric current to pass therethrough when the tool is shearing a chip from said workpiece,
   whereby, during operation of said tool, heating of said cutting edge is minimized.

2. The improvement defined in claim 1, wherein:
   said conductive coating is formed from a material having a higher thermal conductivity than the material from which said tool is formed, thereby increasing the rate at which the coating conducts heat away from said cutting edge.

3. The improvement defined in claim 1, wherein:
   said conductive coating material is copper.

4. The improvement defined in claim 1, further including:
   a tough, electrically insulative coating bonded to said land and said conductive coating, said insulative coating providing an electrical path of least resistance in the area of the tool adjacent the shear zone of the workpiece where the chip is being sheared.

5. In a drill bit, through which electric current may be passed for heating a workpiece, said bit having lands and a groove, said lands being adjacent to a cutting edge, the improvement comprising:
   a relatively thick electrically conductive coating bonded to the surface of said groove, said conductive coating being formed from a material having higher electrical conductivity than the material from which the bit is formed, said conductive coating permitting a substantial portion of the electric current to pass therethrough when the bit is shearing a chip from said workpiece,
   whereby during operation of said bit, heating of said cutting edge is minimized.

6. The improvement defined in claim 5, wherein:
   said conductive coating is formed from a material having higher thermal conductivity than the material from which the bit is formed, thereby increasing the rate at which the conductive coating conducts heat away from said cutting edge.

7. The improvement defined in claim 5, wherein:
   said coating material is copper.

8. The improvement defined in claim 5, further including:
   a tough, electrically insulative coating bonded to said land and said conductive coating, said insulative coating providing an electrical path of least resistance in the area of the bit adjacent the shear zone of the workpiece where the chip is being sheared.

9. In an electrically conductive metal-working tool through which electric current may be passed for heating a workpiece, said tool having a surface adjacent to a cutting edge, the improvement comprising:
   a relatively thick electrically conductive coating bonded to said surface, said coating being formed from a material having higher electrical conductivity than the material from which the metal-working tool is formed, said conductive coating being arranged to conduct electric current passing through it directly to the shear zone of the workpiece where the chip is being sheared,
   whereby, during operation of said tool, heating of said cutting edge is minimized.

10. The improvement defined in claim 9, wherein:
    said coating is formed from a material having a higher thermal conductivity than the material from which said tool is formed.

11. The improvement defined in claim 9, wherein:
    said coating material is copper.

12. The improvement defined in claim 9, further including:
    a tough, electrically insulative coating bonded to said land and said conductive coating, said insulative coating providing an electrical path of least resistance in the area of the tool adjacent the shear zone of the workpiece.

* * * * *